United States Patent [19]

Imasato et al.

[11] Patent Number: 5,127,951
[45] Date of Patent: Jul. 7, 1992

[54] ALUMINUM PIGMENT AND PROCESS FOR PRODUCTION THEREOF

[75] Inventors: Yasunobu Imasato, Ibaraki; Mikio Suzuki, Mito, both of Japan

[73] Assignee: Asahi Kasei Metals Limited, Tokyo, Japan

[21] Appl. No.: 682,550

[22] Filed: Apr. 9, 1991

[30] Foreign Application Priority Data

Apr. 11, 1990 [JP] Japan .................. 2-094161

[51] Int. Cl.$^5$ ................................. C04C 1/62
[52] U.S. Cl. ..................... 106/404; 75/954; 428/546
[58] Field of Search .............. 106/404, 417; 241/15

[56] References Cited

U.S. PATENT DOCUMENTS 4,172,720  10/1979  Megelas .................. 241/15
4,936,913  6/1990   Hieda ..................... 106/404

Primary Examiner—William R. Dixon, Jr.
Assistant Examiner—Margaret V. Einsmann
Attorney, Agent, or Firm—Finnegan, Henderson, Farabow, Garrett & Dunner

[57] ABSTRACT

An aluminum pigment usable for high-quality metallic paints and having a ratio of specific surface area in m$^2$/g to water coverage in m$^2$/g, of 5.0 or less and flakiness of 90 or more is disclosed together with a process for producing such an aluminum pigment.

13 Claims, 1 Drawing Sheet

5,127,951

ALUMINUM PIGMENT AND PROCESS FOR PRODUCTION THEREOF

BACKGROUND OF THE INVENTION

1. Field of the Invention

The present invention relates to an aluminum pigment and process for producing the same. In particular, the present invention relates to an aluminum pigment used in high-quality metallic paints including, for example, high-quality metallic paints for automobile bodies and automotive parts, metallic paints for automobile repairing, metallic paints for household electric appliances, high-quality metallic paints for industrial uses and the like, high-quality metallic printing inks for gravure printing, offset printing, screen printing and the like for plastics and for other uses.

More particularly, the present invention relates to an improved aluminum pigment capable of giving a higher than conventional reflectivity and a very high substrate-hiding power to paint films, prints, plastic films and other materials described above by ordinary application methods.

2. Discussion of the Related Art

Aluminum pigments are generally characterized by their unique metallic impression not possessed by other pigments and their excellent substrate-hiding power and have been widely used for the above-mentioned purposes.

In recent years, automobile appearance has become important. In fact, it has become fashionable to consider the value of the body coating of the automobile equivalent to or even higher than that of the basic functions thereof. One body coating of the past several years appears to possess a white color and a glaring silver metallic tone which has become unpopular, while a soft metallic tone with a pearly luster has gained striking popularity.

There are various types of paints which give a soft metallic tone. Fundamentally, all of these paints contain a special pigment utilizing a light-interfering action (this special pigment is hereinafter referred to as a pearl pigment). A pearl pigment, however, has little or no substrate-hiding power because it is generally transparent and transmits light. Hence, an undercoating step has been necessary prior to the application of a paint containing a pearl pigment in order to hide the substrate. Recently, attempts have been made to eliminate the undercoating step by making a coating by mixing the pearl pigment with an aluminum pigment. This coating, however, has a serious problem in that the mixing impairs the soft metallic tone characterizing the pearl pigment. The problem is caused by the aluminum pigment which is mixed with the pearl pigment.

Two technical factors are necessary in order to impart satisfactory hiding power without impairing the soft metallic tone characterizing the pearl pigment. One technical factor is to minimize the amount of the aluminum pigment to be mixed with the pearl pigment. To achieve this, an aluminum pigment capable of imparting a very high hiding power when used in a small amount is required. The other technical factor is that the aluminum pigment to be mixed with the pearl pigment must have a high reflectivity.

It is generally thought that the soft metallic tone characterizing the pearl pigment is given by the light-interfering action possessed by the pearl pigment. However, the pearl pigment itself has a very low or substantially no light-reflecting ability because the pigment transmits most light. The light-reflecting ability is possessed by the aluminum pigment mixed into the pearl pigment. When the light reflectivity of the aluminum pigment is low, the soft metallic tone of the pearl pigment is not obtained and only a black opaque color tone or appearance having a low commercial value is obtained.

Thus, in order to impart a desired hiding power without impairing the soft metallic tone characterizing the pearl pigment, an aluminum pigment having a high hiding power and a high light reflectivity is required.

In general, an aluminum pigment of higher hiding power has a lower reflectivity. Therefore, it has been difficult to provide an aluminum pigment excellent in both hiding power and reflectivity.

As stated above, as long as any aluminum pigment according to the prior art is used, the soft metallic tone inherently possessed by the pearl pigment is lost. Therefore, it is strongly desired to develop an aluminum pigment suitable for use with the pearl pigment.

A few attempts have been made as follows to solve the above problem. For example, a method wherein an aluminum powder is subjected to surface grinding by wet ball milling to obtain an aluminum pigment of relatively small particle diameter having a high reflectivity is taught by Japanese Patent Application Kokai No. 14358/1974 and an aluminum pigment having a high reflectivity is obtained using an apparatus described in U.S. Pat. No. 3,995,815 (Japanese Patent Publication No. 500504/1980). An aluminum pigment of small particle diameter having a high hiding power is obtained by effecting grinding for a long period of time using a similar apparatus (Japanese Patent Publication No. 17142/1984).

However, none of the aluminum pigments obtained by the above methods possesses a hiding power and reflectivity suitable for use with a pearl pigment.

SUMMARY OF THE INVENTION

It is a primary object of the present invention to provide an aluminum pigment having a high hiding power and a high reflectivity.

The present inventors studied the relation between the basic properties and optical properties of aluminum pigment and, as a result, discovered that an aluminum pigment can exhibit a high hiding power and a very high reflectivity by controlling the ratio of specific surface area to water coverage and the flakiness of the aluminum pigment. This finding has led to the present invention.

DETAILED DESCRIPTION OF PREFERRED EMBODIMENTS

Figure 1:
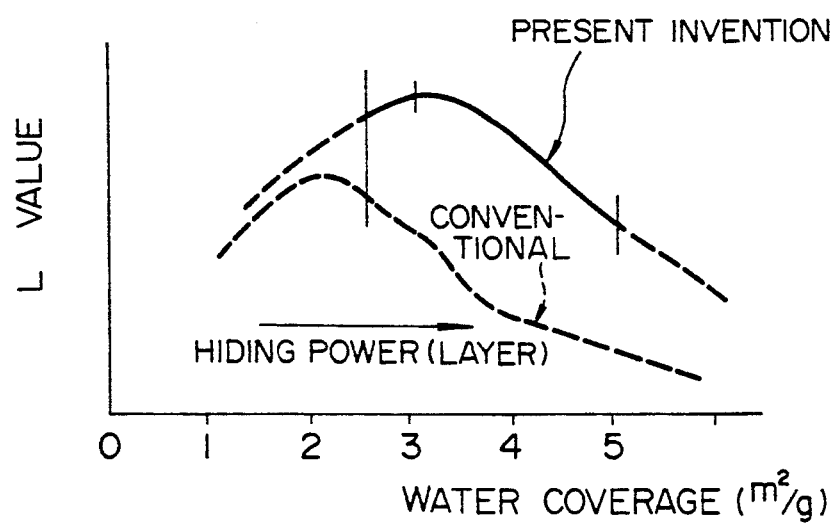
FIG. 1 is a graph showing the relations between water coverage and L value or reflectivity, of an aluminum pigment according to the present invention and of a conventional aluminum pigment.

The present invention provides an aluminum pigment having a ratio of specific surface area in $m^2/g$ to water coverage in $m^2/g$ of 5.0 or less and a flakiness of 90 or more to achieve a higher than conventional reflectivity and a very high hiding power.

More particularly, the recent invention provides an aluminum pigment which, when used together with a pearl pigment, does not impair the soft metallic tone of the pearl pigment.

One pearl pigment which provides a soft metallic tone is a flaky mica powder coated with a metal oxide such as $TiO_2$ or the like. These pearl pigments include those, when orientated in a paint film, giving a pearly luster by multiple reflection of light, those producing color by interference of light due to a thick metal oxide layer, and those further containing a coloring agent. One example of a pearl pigment is EXTERIOR MEARLIN ® produced by the MEARL Corporation. The product comes in various colors such as, for example, Bright White, Bright Gold, Brass, Europearl, Bright Bronze, Bright Orange, Fine Pearl, Fine Gold and Fine Brass. The type of pearl pigment is not particularly restricted in the present invention.

The embodiments of the aluminum pigment of the present invention are not restricted only to their combined use with a pearl pigment. For example, the present aluminum pigment may be used alone or may be used in combination with a transparent organic pigment. In these embodiments as well, the high reflectivity and hiding power of the aluminum pigment are very advantageous properties and can greatly contribute to the enhancement of commercial value.

The ratio of specific surface area to water coverage referred to in the present invention can be measured by the following method.

The specific surface area in $m^2/g$ is an area (S1) per 1 g of an aluminum pigment as calculated from the amount of absorbed nitrogen measured by the BET method; water coverage in $m^2/g$ is an area (S2) per 1 g of an aluminum pigment as measured by the method specified in DIN 55923; the ratio of specific surface area to water coverage can be determined as S1/S2.

A specific surface area tester (Flowsorb 2,300 manufactured by Shimadzu Corp.) was used to measure specific surface area.

The flakiness referred to in the present invention is represented by $d_{50}/t$ wherein the $d_{50}$, in $\mu$ is the average particle diameter of an aluminum pigment and t, in $\mu$, is the average thickness of the aluminum pigment. The average particle diameter ($d_{50}$) can be measured by a laser method (SK laser PRO 7,000 manufactured by Seishin Kigyo K.K.), and the average thickness (t) can be determined by the following formula:

$$t = \frac{10^4}{2.5 \ (g/cm^3) \times \text{water coverage } (cm^2/g)}$$

The novel aluminum pigment according to the present invention has a ratio of specific surface area to water coverage of 5.0 or less and a flakiness of 90 or more. Preferably, the ratio of specific surface area to water coverage is 5.0 or less and the flakiness is 100 or more. More preferably, the ratio of specific surface area to water coverage is 4.0 or less and the flakiness is 100 or more. When the ratio of specific surface area to water coverage is greater than 5.0 or the flakiness is less than 90, there occurs a sharp reduction in reflectivity of the aluminum pigment. When the flakiness is larger than 200, the particles of aluminum pigment bend easily and such a flakiness is not preferred.

Further, the novel aluminum pigment of the present invention preferably has a water coverage of 2.5-5.0 $m^2/g$. When the water coverage is smaller than 2.5 $m^2/g$, the desired hiding power is not obtained. When the water coverage is larger than 5.0 $m^2/g$, a sharp reduction in reflectivity occurs.

Since a maximum L value or reflectivity value is obtained with a water coverage of about 3.0 $m^2/g$, a water coverage of 3.0 $m^2/g$ or more is preferred in view of both hiding power and L value (reference is made to FIG. 1).

As stated above, the specific surface area can be appropriately set based on the ratio of water coverage but is preferably 5-25 $m^2/g$ in view of reflectivity.

In the present invention, the reflectivity of aluminum pigment can be determined by forming a conventional silver metallic film containing only an aluminum pigment and measuring the L value of the film using a color computer. In the present invention, the concentration of aluminum pigment was set at 10 PHR and a paint film was formed by an applicator adjusted to give a film thickness (as dried) of 35-40 $\mu$. However, the film preparation is not restricted to this practice.

That is, an aluminum pigment was incorporated into a commercially available acryl clear (Acrylic 2026GL Clear manufactured by Kansai Paint Co., Ltd.) at a concentration of 10 PHR to prepare a silver metallic paint. The paint was coated on an art paper using an applicator to form a film thereon. The film was dried at room temperature for 24 hours and the dried film was measured for L value using a SM color computer, Model SM-4 manufactured by Suga Shikenki K.K.

The silver metallic film containing only the aluminum pigment of the present invention gives a significantly improved reflectivity (L value) a compared with the film containing a conventional aluminum pigment. The aluminum pigment of the present invention gives a L value of 75-87%, preferably 77-87%.

In the present invention, hiding power refers to the hiding power of a silver metallic paint containing only an aluminum pigment and can be measured as follows. An aluminum pigment is incorporated into an acryl clear (Acrylic 2026GL Clear manufactured by Kansai Paint Co., Ltd.) at a concentration of 5 HPR to prepare a silver metallic paint. This paint is coated on a hiding chart (approved by Japan Paint Inspecting Association) using an applicator, to form films of different thicknesses. The films are dried at room temperature for 24 hours. Each dried film is measured for diffuse reflectivities on white and black portions using a SM color computer, Model SM-2, manufactured by Suga Shikenki K.K. When the ratio of diffuse reflectivity (Rb) of the black portion to diffuse reflectivity (Rw) of the white portion, i.e. Rb/Rw, becomes 98% or more, it is regarded that hiding is complete, and the film thickness giving such a ratio is taken as a hiding film thickness. This hiding film thickness is the hiding power of an aluminum pigment. A smaller hiding film thickness indicates a higher hiding power. The aluminum pigment of the present invention gives a small hiding film thickness of less than 20 $\mu$.

The aluminum pigment of the present invention has a high reflectivity and a very high hiding power. Therefore, the present aluminum pigment, as compared with conventional aluminum pigments, gives a large value when the L value of silver metallic paint film is divided by the hiding film thickness. This differentiates the aluminum pigment of the present invention from conventional aluminum pigments.

The aluminum pigment of the present invention contains coarse particles with a diameter of 44 $\mu$ or more in an amount of 0.1% or less when measured as screening residue, and has an average particle diameter ($d_{50}$) of 5-25 $\mu$ when measured by a laser method (SK laser PRO 7,000) and accordingly has a sharp particle distribution. When the amount of coarse particles of 44 $\mu$ or more, when measured as screening residue, is larger than 0.1%, lumps are seen in the film formed. The amount of coarse particles is preferably 0.05% or less. When the average particle diameter ($d_{50}$) is smaller than 5 $\mu$, the resulting film gives a low reflectivity. When the average particle diameter ($d_{50}$) is larger than 25 $\mu$, the resulting film gives too strong of a reflection from the aluminum particles, impairing the soft metallic tone. The average particle diameter ($d_{50}$) is preferably 7-20 $\mu$.

Preferably, the aluminum pigment of the present invention contains at least one fatty acid derivative selected from fatty acids (e.g. oleic acid, behenic acid, arachic acid, stearic acid, palmitic acid, myristic acid, lauric acid, caproic acid, caprylic acid or capric acid; their metal salts; aliphatic amines (e.g. laurylamine, stearylamine); aliphatic alcohols (e.g. stearyl alcohol, oleyl alcohol); fatty acid amides (e.g. stearamide, oleamide); etc., in order to prevent the agglomeration of pigment. The amount of fatty acid derivative is 0.2-10%, preferably about 0.5-5% based on the amount of aluminum pigment. This amount can be measured as that of the fatty acid derivative soluble in solvent, based on JIS K 5910 5.7. When the amount is smaller than 0.2%, the aluminum pigment causes agglomeration with the passage of a time. When the amount is larger than 10%, the formed film has a low strength.

Next, a process for producing an aluminum pigment of the present invention is described.

One preferred process for producing an aluminum pigment of the present invention is as follows. Using a media agitating mill, grinding of aluminum was effected at a ratio of grinding ball weight to aluminum weight of 33-100, a ratio of grinding solvent weight to aluminum weight of 2.6-10.0, and a maximum grinding energy per each grinding ball of $10^{-6}$ joule or less. With the media agitating mill, the maximum grinding energy per each grinding ball is calculated as the kinetic energy of the ball at the front of each agitating arm.

In the present invention, the maximum grinding energy is preferably in the range of $10^{-9}$ to $10^{-6}$ joule. When the energy is smaller than $10^{-9}$ joule, the time required for grinding is long. When the energy is larger than $10^{-6}$ joule, significant reduction in reflectivity is seen. The maximum grinding energy is more preferably in the range of $10^{-8}$ to $10^{-7}$ joule.

The media agitating mill is considered to be suitable because it allows easy adjustment of the maximum grinding energy at $10^{-6}$ joule or less. The aluminum pigment of the present invention can be produced by grinding at said maximum grinding energy or at a lower energy for a greater number of hours. When grinding occurs at a ratio of grinding ball weight to aluminum weight and a ratio of grinding solvent weight to aluminum weight, in each of the above-mentioned ranges, longer grinding time allows the resulting aluminum pigment to have a higher hiding power but a significantly reduced reflectivity. Therefore, an excessively long time is not preferred. This phenomenon is presumed to result from a nonhomogeneous state inside the mill.

A particularly preferred production process of the present invention is now described in more detail.

The aluminum used in the present invention includes an atomized powder obtained by an atomization method, a foil powder obtained from an aluminum foil or the like, a waste foil, etc. A preferred aluminum powder has a particle diameter of 0.1 mm or less, more preferably 100 $\mu$ or less, even more preferably 20 $\mu$ or less. Also preferred is an aluminum powder containing impurities other than aluminum in amounts as small as possible. The aluminum purity of the aluminum powder is preferably 99.0% or more, more preferably 99.5% or more.

The grinding aid used is not particularly restricted, and there can be mentioned those conventionally used, such as higher fatty acids (e.g. lauric acid, myristic acid, palmitic acid, stearic acid, arachic acid, behenic acid); higher unsaturated fatty acids (e.g. oleic acid); higher aliphatic amines (e.g. stearylamine); higher aliphatic alcohols (e.g. stearyl alcohol, oleyl alcohol); higher fatty acid amides (e.g. stearamide, oleamide); and metal salts of higher fatty acids (e.g. aluminum stearate, aluminum oleate). The grinding aid is used in an amount of preferably 0.2-10% based on the amount of aluminum. When the amount is smaller than 0.2%, aluminum particles cause agglomeration due to the shortage of the grinding aid when the specific surface area of aluminum particles has been increased by grinding. When the amount is larger than 10%, the grinding aid reduces the strength of the film formed. The amount of the grinding aid is more preferably 0.5-5%.

The grinding solvent has no particular restriction. Conventional hydrocarbon solvents such as mineral spirits, solvent naphtha and the like can be used. Solvents of the alcohol type, ether type, ketone type, ester type and others can be used.

In order to obtain an appropriate grinding force, the grinding balls can be steel balls, stainless steel balls, glass balls, alumina balls, or other balls conventionally used. The grinding balls have the appropriate diameter depending upon their specific gravity. It is possible to use grinding balls having two or more diameters, in combination. The material of the grinding balls need not be particularly restricted, but steel is generally used in view of economy and quality.

When steel balls are used in view of the desired range of grinding energy, the steel balls preferably have diameters of 5.0 mm or less, more preferably diameters of less than 3.2 mm. The grinding temperature is not restricted particularly but is preferably 15-60° C. A grinding temperature lower than 15° C. requires a large amount of a cooling medium and is not preferred. A grinding temperature higher than 60° C. has increased risk of flaming of the solvent, etc. and is not preferred.

Figure 2:
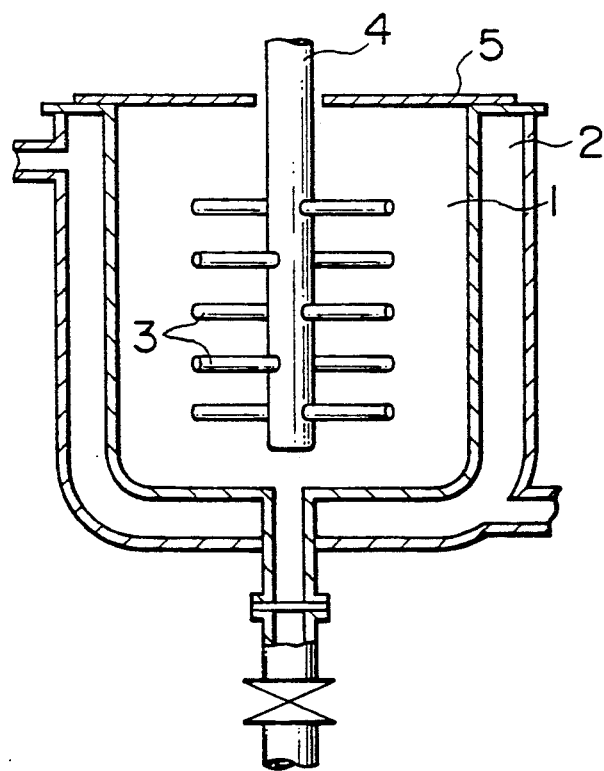
FIG. 2 shows a media agitating mill suitable for use in the production of a pigment of the present invention.

The media agitating mill used in the present invention has a structure, for example, shown in FIG. 2. A fixed container 10 is provided, at the outer circumference, with a jacket 12 through which water or hot water is passed for temperature control during grinding. In the center of the container, several agitating arms 14 of round rod type are fitted to a shaft perpendicularly thereto to form an agitator 16 capable of rotating at a desired speed of 0-500 rpm. The diameter, length and number of the agitating arms of round rod type vary by the size of the container 10. A cover 18 is provided on the top of the container 10 as necessary.

In the media agitating mill, the grinding energy can be controlled by the grinding balls and the rotation of the agitator. When the same grinding balls are used, the grinding energy is determined by the arm diameter and the rotation of the agitator. The arm diameter is substantially determined by the capacity of the media agitating mill, but the rotation is optional. The rotation required for obtaining a grinding energy suitable for use in the present invention cannot be specified because the rotation differs depending upon the size of the container 1, but the speed at the front or free end of an agitating arm of the round rod type is preferably 3 m/sec or less. During the final stage of grinding, the inside of the media agitating mill is washed with an excess of solvent. The aluminum pigment in which the aluminum has a flaky shape is taken out of the mill as a slurry and passed through a wet screen, which differs depending upon the application of final pigment, to remove coarse particles. The resulting slurry is passed through a filter (e.g. filter press) to remove excessive solvent to obtain the aluminum pigment in a paste form.

The present invention is hereinafter described specifically by way of nonlimiting Examples.

EXAMPLE 1

The following materials were fed into a 5.5-l media agitating mill (Attritor MA-1SE Model manufactured by Mitsui Miike Kakoki K.K.).

| | |
|---|---|
| 3/32 in. steel balls | 16.5 kg |
| Atomized aluminum powder (average particle diameter: 6μ) | 0.25 kg |
| Mineral spirits | 1.3 kg |
| Oleic acid | 5 g |

The above materials were agitated at 200 rpm for 3 hours. After the completion of the agitation, the slurry in the mill was washed out with 10 l of mineral spirits and passed through a vibrating screen to remove coarse particles. The resulting slurry was passed through a filter to remove excessive solvent to obtain an aluminum pigment cake. Mineral spirits and oleic acid (1% relative to the nonvolatile content) were added to this aluminum pigment cake to prepare an aluminum pigment paste having a nonvolatile content of 65%. The aluminum pigment had the following properties.

| | |
|---|---|
| Specific surface area | 8.3 m$^2$/g |
| Water coverage | 3.0 m$^2$/g |
| Average particle diameter d$_{50}$ | 16.3μ |
| Particle thickness t | 0.133μ |
| Specific surface area/water coverage | 2.77 |
| Flakiness | 123 |
| L value of paint film (A) | 80% |
| Hiding film thickness of paint film (B) | 14μ |
| (A)/(B) | 5.71 |

This aluminum pigment meets the requirements of the present invention.

For comparison, a conventional aluminum pigment paste having about the same average particle diameter, M-601 manufactured by Asahi Kasei Metals K.K. was measured for properties. The results were as follows.

| | |
|---|---|
| Specific surface area | 9.1 m$^2$/g |
| Water coverage | 1.4 m$^2$/g |
| Average particle diameter d$_{50}$ | 17.0μ |
| Particle thickness t | 0.286μ |
| Specific surface area/ water coverage | 6.50 |
| L value of paint film (A) | 73% |
| Hiding film thickness of paint film (B) | 28μ |
| (A)/(B) | 2.61 |

As is clear from the above results, the aluminum pigment of the present invention showed significant improvement in reflectivity (L value) and improvement of about two times in hiding power, as compared with the conventional aluminum pigment.

EXAMPLE 2 AND COMPARATIVE EXAMPLES 1 TO 3

Using the same media agitating mill as in Example 1, aluminum pigments (samples 2-10) were prepared under the conditions shown in Table 1. The total weight of grinding balls was maintained constant (16.5 kg).

The properties of the samples 2-10 are shown in Table 2 together with those of a conventional aluminum pigment paste, MC-808 manufactured by Asahi Kasei Metals K.K.

As a result, the samples 2-7 of the present invention showed significant improvements in the L value of paint film and hiding power, as compared with the samples 8-10 of Comparative Examples 1 to 3 and MC-808.

EXAMPLE 3

The sample 2 obtained in Example 2 and a pearl pigment (EXTERIOR MEARLIN ® Fine Pearl manufactured by The Meal Corporation) were incorporated into an acryl clear pigment so that each pigment concentration became 5 PHR, whereby a paint was prepared. The paint was coated on a hiding chart (meeting JIS K 5400 and approved by Japan Paint Inspecting Association) using an applicator of 6 mil, to form a film of 20 μ in thickness. The film was dried at room temperature for 24 hours.

Using a conventional aluminum pigment, MC-8808 manufactured by Asahi Kasei Metals K.K. and the same pearl pigment, a film was formed in the same manner as above. The two films were compared by visual inspection.

As a result, the paint film using the sample 2 of the present invention had a soft metallic tone characteristic of pearl pigments and hid the substrate at a hiding film thickness of 9 μ. In contrast, the paint film using MC-808 had a black opaque tone and did not hide the substrate.

COMPARATIVE EXAMPLE 4

35 kg of steel balls of 3/16 inches in diameter, 750 g of an atomized aluminum powder having an average particle diameter of 10 μ, 2.15 kg of mineral spirits and 7.5 g of stearylamine were fed into a ball mill made of iron. The ball mill was operated at 58 rpm for 3 hours. After completion of the operation, the slurry in the ball mill was washed out with 10 l of mineral spirits. Subsequently, the procedure of Example 1 was used to obtain a sample 11. The operating conditions and evaluation results are shown in Tables 1 and 2.

In summary, the samples 2 to 7 of the present invention showed significant improvements in L value of the resultant paint films.

The present invention provides an aluminum pigment having a high hiding power and a high light relfectivity.

TABLE 1

| Sample No. | | Weight ratio of grinding balls/ aluminum | Weight ratio of grinding solvent/ aluminum | Type and amount of grinding aid (wt. % relative to aluminum) | Particle diameter of material aluminum (μ) | Diameter of grinding balls (mmθ) | (rpm) | Stirring time (hr) |
|---|---|---|---|---|---|---|---|---|
| Example 2 (Present Invention) | 2 | 66 | 5.2 | Oleic acid 2.0 | 6 | ⅛ in. | 375 | 3.0 |
| | 3 | 44 | 3.5 | Oleic acid 2.0 | 6 | ⅛ in. | 375 | 4.0 |
| | 4 | 44 | 3.5 | Stearyl-amine 2.0 | 6 | ⅛ in. | 200 | 3.0 |
| | 5 | 82.5 | 8.0 | Stearyl-amine 2.0 | 10 | 3/32 in. | 200 | 3.5 |
| | 6 | 93 | 8.5 | Stearyl-amine 4.0 | 6 | ⅛ in. | 200 | 3.0 |
| | 7 | 82.5 | 5.2 | Stearyl-amine 2.0 | 6 | 3/32 in. | 200 | 3.0 |
| Comparative Example 1 | 8 | 18.6 | 1.5 | Stearyl-amine 2.0 | 6 | ⅛ in. | 200 | 3.0 |
| Comparative Example 2 | 9 | 82.5 | 1.5 | Stearyl-amine 2.0 | 13 | ⅛ in. | 200 | 0.5 |
| Comparative Example 3 | 10 | 66.7 | 1.04 | Stearyl-amine 38.0 | 60 | 3/16 in. | 200 | 8.0 |
| Comparative Example 4 | 11 | 46.7 | 2.9 | Stearyl-amine 1.0 | 10 | 3/16 in. | 58 by ball mill | 3.0 |

TABLE 2

| Sample No. | | Specific surface area ($m^2/g$) | Water coverage ($m^2/g$) | Average particle diameter d50 (μ) | Thickness of particles t (μ) | Ratio of specific surface area/ water coverage | Flatness | L value of film A (%) | Hiding film thickness B (μ) | A/B |
|---|---|---|---|---|---|---|---|---|---|---|
| Example 2 (Present Invention) | 2 | 11.4 | 4.1 | 13.5 | 0.098 | 2.78 | 138 | 79.5 | 10 | 7.95 |
| | 3 | 8.4 | 2.7 | 14.1 | 0.148 | 3.11 | 95 | 79.0 | 15 | 5.27 |
| | 4 | 11.8 | 4.3 | 11.8 | 0.093 | 2.74 | 120 | 77.5 | 8 | 9.69 |
| | 5 | 12.0 | 3.3 | 17.0 | 0.121 | 3.64 | 140 | 78.0 | 12 | 6.50 |
| | 6 | 8.5 | 2.9 | 16.3 | 0.138 | 2.93 | 118 | 80.5 | 14 | 5.75 |
| | 7 | 10.3 | 3.2 | 15.7 | 0.125 | 3.22 | 126 | 81.5 | 13 | 6.27 |
| Comparative Example 1 | 8 | 14.4 | 2.3 | 12.5 | 0.174 | 6.28 | 72 | 74.0 | 20 | 3.70 |
| Comparative Sampel MC-808 | | 10.8 | 2.1 | 13.4 | 0.190 | 5.15 | 71 | 73.0 | 21 | 3.48 |
| Comparative Example 2 | 9 | 3.0 | 0.8 | 18.5 | 0.463 | 3.75 | 23 | 73.0 | 45 | 1.62 |
| Comparative Example 3 | 10 | 27.0 | 5.3 | 5.0 | 0.070 | 5.09 | 71 | 65.0 | 8 | 8.15 |
| Comparative Example 4 | 11 | 2.8 | 0.7 | 23.6 | 0.507 | 4.00 | 47 | 72.0 | 50 | 1.44 |

What is claimed is:

1. An aluminum pigment having a water coverage of 2.5-5.0 $m^2/g$, a ratio of specific surface area in $m^2/g$ to water coverage in $m^2/g$, of 5.0 or less, an amount of coarse particles with a diameter of 44 μ or more of 0.1% or less, and an average particle diameter $d_{50}$ of 5-25 μ.

2. The aluminum pigment according to claim 1 having a flakiness of from 100 to 200.

3. The aluminum pigment according to claim 1 having a reflectivity in the range of 75% to 87%.

4. The aluminum pigment according to claim 1 having a hiding film thickness of less than 20 μ.

5. An aluminum pigment according to claim 1, containing a fatty acid derivative.

6. The aluminum pigment according to claim 1 containing also a pearl pigment.

7. The aluminum pigment according to claim 1 containing also a transparent organic pigment.

8. A process for producing an aluminum pigment which comprises grinding aluminum by giving a maximum grinding energy of $10^{-9}$ to $10^{-6}$ joule per grinding ball at a ratio of grinding ball weight to aluminum weight of 33-100 and a ratio of grinding solvent weight to aluminum weight of 2.6 to 10.0.

9. The process according to claim 6 using a media agitating mill.

10. The process according to claim 7 wherein a grinding aid is used that comprises a material selected from the group consisting of a higher fatty acid, a higher unsaturated fatty acid, a higher aliphatic amine, a higher aliphatic alcohol, a higher fatty acid amide, and a metal salt of a higher fatty acid.

11. The process according to claim 8 wherein the amount of grinding aid is 0.2 to 10% based on the amount of aluminum.

12. The process according to claim 7 wherein the grinding balls in said mill are steel, stainless steel, glass or alumina.

13. The process according to claim 10 wherein steel balls have a diameter of 5.0 mm or less are used.

* * * * *

UNITED STATES PATENT AND TRADEMARK OFFICE
CERTIFICATE OF CORRECTION

PATENT NO. : 5,127,951
DATED : July 7, 1992
INVENTOR(S) : Yasunobu IMASATO et al.

It is certified that error appears in the above-identified patent and that said Letters Patent is hereby corrected as shown below:

Claim 1, column 9, line 52, "$\mu$or" should read --$\mu$ or--.

Claim 9, column 10, line 52, "claim 6" should read --claim 8--.

Claim 10, column 10, line 54, "claim 7" should read --claim 9--.

Claim 11, column 10, line 60, "claim 8" should read --claim 10--.

Claim 12, column 10, line 63, "claim 7" should read --claim 9--.

Claim 13, column 10, line 66, "claim 10" should read --claim 12--; and

Signed and Sealed this

Eleventh Day of January, 1994

Attest:

BRUCE LEHMAN

Attesting Officer     Commissioner of Patents and Trademarks